(12) United States Patent
Savery et al.

(10) Patent No.: US 7,353,876 B2
(45) Date of Patent: Apr. 8, 2008

(54) SELF-DEGRADING CEMENT COMPOSITIONS AND METHODS OF USING SELF-DEGRADING CEMENT COMPOSITIONS IN SUBTERRANEAN FORMATIONS

(75) Inventors: Mark R. Savery, Duncan, OK (US); Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 189 days.

(21) Appl. No.: 11/048,272

(22) Filed: Feb. 1, 2005

(65) Prior Publication Data
US 2006/0169451 A1    Aug. 3, 2006

(51) Int. Cl.
*E21B 43/00* (2006.01)
(52) U.S. Cl. .................. 166/308.5; 166/177.5
(58) Field of Classification Search ............ 166/308.1, 166/308.2, 308.5, 177.5
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Palmer | 260/78.3 |
| 3,173,484 A | 3/1965 | Huitt et al. | 166/280.1 |
| 3,195,635 A | 7/1965 | Fast | 166/280.1 |
| 3,272,650 A | 9/1966 | MacVittie | 134/7 |
| 3,302,719 A | 2/1967 | Fischer | 166/280.2 |
| 3,364,995 A | 1/1968 | Atkins et al. | 166/280.1 |
| 3,366,178 A | 1/1968 | Malone et al. | 166/280.1 |
| 3,448,800 A | 6/1969 | Parker et al. | 166/294 |
| 3,455,390 A | 7/1969 | Gallus | 166/295 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,868,998 A | 3/1975 | Lybarger et al. | 166/278 |
| 3,912,692 A | 10/1975 | Casey et al. | 260/78.3 |
| 3,948,672 A | 4/1976 | Harnsberger | 106/90 |
| 3,955,993 A | 5/1976 | Curtice | 106/90 |
| 3,960,736 A | 6/1976 | Free et al. | 252/8.55 R |
| 3,968,840 A | 7/1976 | Tate | 166/280.1 |
| 3,998,272 A | 12/1976 | Maly | 166/281 |
| 3,998,744 A | 12/1976 | Arnold et al. | 507/269 |
| 4,068,718 A | 1/1978 | Cooke, Jr. et al. | 166/280.2 |
| 4,083,407 A | 4/1978 | Griffin et al. | 166/291 |

(Continued)

FOREIGN PATENT DOCUMENTS

EP    0 510 762 A2    10/1992

(Continued)

OTHER PUBLICATIONS

U.S. Appl. No. 10/650,101, filed Aug. 26, 2003, Todd et al.

(Continued)

*Primary Examiner*—William P Neuder
(74) *Attorney, Agent, or Firm*—Robert A. Kent; Baker Botts, L.L.P.

(57) ABSTRACT

Methods of stimulating subterranean formations are provided. More particularly, methods of fracturing subterranean formations using a fracturing fluid comprising a self-degrading cement composition are provided. An example of a method is a method of treating a subterranean formation. Another example of a method is a method of fracturing a subterranean formation. Another example of a method is a method of producing hydrocarbons from a subterranean formation.

20 Claims, 3 Drawing Sheets

U.S. PATENT DOCUMENTS

| | | | |
|---|---|---|---|
| 4,169,798 A | 10/1979 | DeMartino | 252/8.55 R |
| 4,172,066 A | 10/1979 | Zweigle et al. | 260/29.6 TA |
| 4,261,421 A | 4/1981 | Watanabe | 166/281 |
| 4,387,769 A | 6/1983 | Erbstoesser et al. | 166/295 |
| 4,460,052 A | 7/1984 | Gockel | 175/72 |
| 4,470,915 A | 9/1984 | Conway | 252/8.55 R |
| 4,498,995 A | 2/1985 | Gockel | 252/8.5 LC |
| 4,526,695 A | 7/1985 | Erbstoesser et al. | 252/8.55 R |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,785,884 A | 11/1988 | Armbruster | 166/280 |
| 4,797,262 A | 1/1989 | Dewitz | 422/142 |
| 4,809,783 A | 3/1989 | Hollenbeck et al. | 166/307 |
| 4,817,721 A | 4/1989 | Pober | 166/295 |
| 4,843,118 A | 6/1989 | Lai et al. | 524/555 |
| 4,848,467 A | 7/1989 | Cantu et al. | 166/281 |
| 4,886,354 A | 12/1989 | Welch et al. | 356/70 |
| 4,957,165 A | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,082,056 A | 1/1992 | Tackett, Jr. | 166/295 |
| 5,142,023 A | 8/1992 | Gruber et al. | 528/354 |
| 5,216,050 A | 6/1993 | Sinclair | 524/108 |
| 5,247,059 A | 9/1993 | Gruber et al. | 528/354 |
| 5,249,628 A | 10/1993 | Surjaatmadja | 166/305 |
| 5,295,542 A | 3/1994 | Cole et al. | 166/278 |
| 5,311,945 A | 5/1994 | Cowan et al. | 166/292 |
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,497,830 A | 3/1996 | Boles et al. | 166/300 |
| 5,499,678 A | 3/1996 | Surjaatmadja et al. | 166/298 |
| 5,505,787 A | 4/1996 | Yamaguchi | 134/4 |
| 5,512,071 A | 4/1996 | Yam et al. | 51/307 |
| 5,518,541 A | 5/1996 | Fogel et al. | 106/691 |
| 5,536,807 A | 7/1996 | Gruber et al. | 528/354 |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | 507/211 |
| 5,670,473 A | 9/1997 | Scepanski | 510/445 |
| 5,698,322 A | 12/1997 | Tsai et al. | 428/373 |
| 5,765,642 A | 6/1998 | Surjaatmadja | 166/297 |
| 5,791,415 A | 8/1998 | Nguyen et al. | 166/280 |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,924,488 A | 7/1999 | Nguyen et al. | 166/280 |
| 5,964,291 A | 10/1999 | Bourne et al. | 166/279 |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,114,410 A | 9/2000 | Betzold | 523/130 |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,203,213 B1 | 3/2001 | Seo et al. | 385/96 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,454,003 B1 | 9/2002 | Chang et al. | 166/270 |
| 6,485,947 B1 | 11/2002 | Rajgarhia et al. | 435/139 |
| 6,488,763 B2 | 12/2002 | Brothers et al. | 106/692 |
| 6,494,263 B2 | 12/2002 | Todd | 166/312 |
| 6,508,305 B1 | 1/2003 | Brannon et al. | 166/293 |
| 6,527,051 B1 | 3/2003 | Reddy et al. | 166/300 |
| 6,554,071 B1 | 4/2003 | Reddy et al. | 166/293 |
| 6,569,814 B1 | 5/2003 | Brady et al. | 507/201 |
| 6,599,863 B1 | 7/2003 | Palmer et al. | 507/219 |
| 6,667,279 B1 | 12/2003 | Hessert et al. | 507/225 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,702,023 B1 | 3/2004 | Harris et al. | 166/307 |
| 6,710,019 B1 | 3/2004 | Sawdon et al. | 507/136 |
| 6,761,218 B2 | 7/2004 | Nguyen et al. | 166/278 |
| 6,763,888 B1 | 7/2004 | Harris et al. | 166/305.1 |
| 6,817,414 B2 | 11/2004 | Lee | 166/278 |
| 6,837,309 B2 | 1/2005 | Boney et al. | 166/280.2 |
| 6,896,058 B2 | 5/2005 | Munoz, Jr. et al. | 166/279 |
| 6,949,491 B2 | 9/2005 | Cooke, Jr. | 507/219 |
| 7,080,688 B2 | 7/2006 | Todd et al. | 166/278 |
| 7,096,947 B2 * | 8/2006 | Todd et al. | 166/283 |
| 7,178,596 B2 | 2/2007 | Blauch et al. | 166/280 |
| 7,219,731 B2 | 5/2007 | Sullivan et al. | 166/278 |
| 2001/0016562 A1 | 8/2001 | Muir et al. | 507/201 |
| 2002/0036088 A1 | 3/2002 | Todd | 166/300 |
| 2002/0125012 A1 | 9/2002 | Dawson et al. | 166/300 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0188766 A1 | 10/2003 | Banerjee et al. | 134/7 |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |
| 2004/0055747 A1 | 3/2004 | Lee | 166/278 |
| 2004/0094300 A1 | 5/2004 | Sullivan et al. | 166/308.1 |
| 2004/0106525 A1 | 6/2004 | Willbert et al. | 507/200 |
| 2004/0138068 A1 | 7/2004 | Rimmer et al. | 507/100 |
| 2004/0152601 A1 | 8/2004 | Still et al. | 507/100 |
| 2004/0152602 A1 | 8/2004 | Boles | 507/100 |
| 2004/0216876 A1 | 11/2004 | Lee | 166/280.1 |
| 2004/0231845 A1 | 11/2004 | Cooke, Jr. | 166/279 |
| 2004/0261995 A1 | 12/2004 | Nguyen et al. | 166/279 |
| 2004/0261996 A1 | 12/2004 | Munoz, Jr. et al. | 166/279 |
| 2005/0006095 A1 | 1/2005 | Justus et al. | 166/295 |
| 2005/0028976 A1 | 2/2005 | Nguyen | 166/276 |
| 2005/0034861 A1 | 2/2005 | Saini et al. | 166/278 |

| | | | |
|---|---|---|---|
| 2005/0034865 A1 | 2/2005 | Todd et al. .................. 166/304 |
| 2005/0034868 A1 | 2/2005 | Frost et al. .................. 166/307 |
| 2005/0045328 A1 | 3/2005 | Frost et al. .................. 166/278 |
| 2005/0051330 A1 | 3/2005 | Nguyen ...................... 166/276 |
| 2005/0051363 A1 | 3/2005 | Munoz, Jr. et al. |
| 2005/0056423 A1 | 3/2005 | Todd et al. .................. 166/278 |
| 2005/0059556 A1 | 3/2005 | Munoz, Jr. et al. ......... 507/103 |
| 2005/0059557 A1 | 3/2005 | Todd et al. .................. 507/110 |
| 2005/0103496 A1 | 5/2005 | Todd et al. .................. 166/278 |
| 2005/0126780 A1 | 6/2005 | Todd et al. |
| 2005/0126785 A1 | 6/2005 | Todd |
| 2005/0130848 A1 | 6/2005 | Todd et al. |
| 2005/0161220 A1 | 7/2005 | Todd et al. |
| 2005/0167104 A1 | 8/2005 | Roddy et al. |
| 2005/0167105 A1 | 8/2005 | Roddy et al. |
| 2005/0167107 A1 | 8/2005 | Roddy et al. |
| 2005/0183741 A1 | 8/2005 | Surjaatmadja et al. |
| 2005/0205265 A1 | 9/2005 | Todd et al. |
| 2005/0205266 A1 | 9/2005 | Todd et al. |
| 2005/0205858 A1 | 9/2005 | Reddy et al. |
| 2005/0252659 A1 | 11/2005 | Sullivan et al. .......... 166/280.1 |
| 2005/0272613 A1 | 12/2005 | Cooke, Jr. .................. 507/219 |
| 2006/0105917 A1 | 5/2006 | Munoz, Jr. .................. 507/103 |
| 2006/0185848 A1* | 8/2006 | Surjaatmadja et al. ... 166/280.2 |
| 2006/0283597 A1 | 12/2006 | Schriener et al. ........... 166/300 |

FOREIGN PATENT DOCUMENTS

| | | |
|---|---|---|
| EP | 0 879 935 A2 | 11/1998 |
| EP | 0 879 935 A3 | 2/1999 |
| EP | 1 413 710 A1 | 4/2004 |
| WO | WO 93/15127 A1 | 8/1993 |
| WO | WO 94/07949 A1 | 4/1994 |
| WO | WO 94/08078 A1 | 4/1994 |
| WO | WO 94/08090 A1 | 4/1994 |
| WO | WO 95/09879 A1 | 4/1995 |
| WO | WO 97/11845 A1 | 4/1997 |
| WO | WO 99/27229 | 6/1999 |
| WO | WO 99/27229 A1 | 6/1999 |
| WO | WO 00/57022 | 9/2000 |
| WO | WO 01/02698 | 1/2001 |
| WO | WO 01/87797 A1 | 11/2001 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 2004/037946 A1 | 5/2004 |
| WO | WO 2004/038176 A1 | 5/2004 |
| WO | WO 2005/000993 | 6/2004 |
| WO | WO 2005/090259 A2 | 12/2004 |
| WO | WO 2005/090259 A3 | 12/2004 |

OTHER PUBLICATIONS

U.S. Appl. No. 10/864,061, filed Jun. 9, 2004, Blauch et al.
U.S. Appl. No. 10/864,618, filed Jun. 9, 2004, Blauch et al.
U.S. Appl. No. 10/897,509, filed Jul. 23, 2004, Pauls et al.
U.S. Appl. No. 10/915,024, filed Aug. 10, 2004, Nguyen.
U.S. Appl. No. 10/932,749, filed Sep. 2, 2004, Harris et al.
U.S. Appl. No. 10/933,705, filed Sep. 3, 2004, Kalman.
U.S. Appl. No. 10/950,072, filed Sep. 24, 2004, Nguyen et al.
U.S. Appl. No. 10/991,228, filed Nov. 17, 2004, Munoz, Jr. et al.
U.S. Appl. No. 10/991,248, filed Nov. 17, 2004, Munoz, Jr. et al.
U.S. Appl. No. 11/046,043, filed Jan. 28, 2005, Todd et al.
U.S. Appl. No. 11/046,652, filed Jan. 28, 2005, Todd et al.
U.S. Appl. No. 11/047,876, filed Jan. 31, 2005, Mang et al.
U.S. Appl. No. 11/048,417, filed Jan. 31, 2005, Mang et al.
U.S. Appl. No. 11/049,464, filed Feb. 2, 2005, Mang et al.
U.S. Appl. No. 11/049,483, filed Feb. 2, 2005, Mang et al.
U.S. Appl. No. 11/049,600, filed Feb. 2, 2005, Mang et al.
U.S. Appl. No 11/049,601, filed Feb. 2, 2005, Mang et al.
U.S. Appl. No. 11/062,943, Feb. 22, 2005, Saini et al.
U.S. Appl. No. 11/062,956, filed Feb. 22, 2005, Surjaatmadja et al.
U.S. Appl. No. 11/147,093, filed Jun. 7, 2005, Todd et al.
U.S. Appl. No. 11/128,060, filed May 12, 2005, Saini.
U.S. Appl. No. 11/127,583, filed May 12, 2005, Saini.
Cantu, et al, *Laboratory and Field Evaluation of a Combined Fluid-Loss-Control Additive and Gel Breaker for Fracturing Fluids*, SPE 18211, Society of Petroleum Engineers, 1990.
Love, et al, *Selectively Placing Many Fractures in Openhole Horizontal Wells Improves Production*, SPE 50422, Society of Petroleum Engineers, 1998.
McDaniel, et al, *Evolving New Stimulation Process Proves Highly Effective in Level 1 Dual-Lateral Completion*, SPE 78697, Society of Petroleum Engineers, 2002.
Albertsson, et al, *Aliphatic Polyesters: Systhesis, Properties and Applications*, Advances in Polymer Science, vol. 157, Degradable Aliphatic Polyesters, 2002.
Funkhouser, et al, *Synthetic Polymer Fracturing Fluid for High-Temperature Applications*, SPE 80236, Society of Petroleum Engineers, 2003.
*Chelating Agents*, Encyclopedia of Chemical Technology, vol. 5 (764-795).
Halliburton, *SurgiFrac$^{SM}$ Service, A Quick and Cost-Effective Method to Help Boost Production From Openhole Horizontal Completions*, Halliburton Communications, HO3297, 2002.
Halliburton, *Cobra Frac$^{SM}$ Service, Coiled Tubing Fracturing—Cost-Effective Method for Stimulating Untapped Reserves*, HO2319R, Halliburton Energy Services, 2000.
Halliburton, *CobraJet Frac$^{SM}$ Service, Cost-effective Technology That Can Help Reduce Cost Per BOE Produced, Shorten Cycle Time and Reduce Capex*, Halliburton Communications.
Y. Chiang et al., *Hydrolysis Of Ortho Esters; Further Investigation Of The Factors Which Control The Rate-Determining Step*, Engineering Information, Inc. NY, NY, vol. 105, No. 23 (XP-002322842), Nov. 16, 1983.
M. Ahmad, et al., *Ortho Ester Hydrolysis: Direct Evidence For A Three-Stage Reaction Mechanism*, Engineering Information, Inc. NY, NY, vol. 101, No. 10 (XP-002322843), May 9, 1979.
Skrabal et al, *The Hydrolysis Rate Of Orthoformic Acid Ethyl Ether*, Chemical Institute of the University of Graz, Jan. 13, 1921, pp. 1-38.
Heller, et al., *Poly(ortho esters)—From Concept To Reality*, Biomacromolecules, vol. 5, No. 5, 2004 (pp. 1625-1632), May 9, 1979.
Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).
Ng, et al., *Synthesis and Erosion Studies of Self-Catalyzed Poly(ortho ester)s*, American Chemical Society, vol. 30, No. 4, 1997 (pp. 770-772).
Ng, et al., *Development Of A Poly(ortho ester) prototype With A Latent Acid In The Polymer Backbone For 5-fluorouracil Delivery*, Journal of Controlled Release 65 (2000), (pp. 367-374).
Rothen-Weinhold, et al., Release of BSA from poly(ortho ester) extruded thin strands, *Journal of Controlled Release 71*, 2001, (pp. 31-37).
Heller, et al., *Poly(ortho ester)s—their development and some recent applications*, European Journal of Pharmaceutics and Biopharmaceutics, 50, 2000, (pp. 121-128).
Heller, et al., *Poly(ortho esters); synthesis, characterization, properties and uses*, Advanced Drug Delivery Reviews, 54, 2002, (pp. 1015-1039).
Heller, et al., *Poly(ortho esters) For The Pulsed And Continuous Delivery of Peptides And Proteins*, Controlled Release and Biomedical Polymers Department, SRI International, (pp. 39-46).
Zignani, et al., *Subconjunctival biocompatibility of a viscous bioerodable poly(ortho ester)*, J. Biomed Mater Res, 39, 1998, pp. 277-285.
Toncheva, et al., *Use of Block Copolymers of Poly(Ortho Esters) and Poly (Ethylene Glycol)*, Journal of Drug Targeting, 2003, vol. 11(6), pp. 345-353.
Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemcial "Trigger" Useful for Oilfleid Applications*, Society of Petroleum Engineers, Inc., SPE 92709, Feb. 4, 2005.

Foreign communication related to a counter part dated May 23, 2006.

U.S. Appl. No. 10/608,319, filed Jun. 27, 2003, Nguyen.

U.S. Appl. No. 10/608,373, filed Jun. 27, 2003, Nguyen.

U.S. Appl. No. 10/802,340, filed Mar. 17, 2004, Reddy et al.

U.S. Appl. No. 10/947,427, filed Sep. 20, 2004, Blauch et al.

U.S. App. (Ser. No. Unassigned), Savery et al.

Simmons, et al., *Poly(phenyllactide): Synthesis, Characterization, and Hydrolytic Degradation*, Biomacromolecules, vol. 2, No. 2, 2001 (pp. 658-663).

Yin, et al., *Preparation and Characterization of Substituted Polylactides*, American Chemical Society, vol. 32, No. 23, 1999 (pp. 7711-7718).

Yin, et al., *Synthesis and Properties of Polymers Derived from Substituted Lactic Acids*, American Chemical Society, Ch. 12, 2001 (pp. 147-159).

Dechy-Cabaret, et al, *Controlled Ring-Opening Polymerization of Lactide and Glycolide*, American Chemical Society, Chemical Reviews, A-Z, AA-AD, received 2004.

Vichaibun, et al, *A New Assay for the Enzymatic Degradation of Polylactic Acid, Short Report*, ScienceAsia, vol. 29, 2003 (pp. 297-300).

Wilson, A. D., et al, *Chemistry of Solid State Materials, 3, Acid-base Cements, Their Biomedical and Industrial Applications*, Cambridge University Press, 1993, Contents, Chs. 1-2, 5-9.

Jeong, et al, *Chemically Bonded Phosphate Ceramics: Cementing The Gap Between Ceramics And Cements*, Argonne National Laboratory, Jun. 2002.

The Civil Engineering Research Foundation, *New Materials and Technologies Available for Use in Industrial Infrastructure, An Overview*, prepared for the Department of Energy, Office of Energy Efficiency and Renewable Energy, Mar. 25, 2003.

Anderson, et al, *PaveMend™ as a Solution for Rapid Runway Repair*, (publishing information unknown, printed from website@ www.ceratechinc.com on Jan. 24, 2005).

Argonne National Laboratory, *Overview: Ceramicrete—Ceramicrete Provides Concrete Evidence of Superior Performance*, (publishing information unknown).

CeraTech (CTI), *PaveMend, Rapid Repair Family of Materials*.

Argonne National Laboratory, *Technology Transfer at Argonne, Commercialization and Licensing Opportunity*, (publishing information unknown, printed from website@ www.techtransfer.anl.gov/techtour/ceramicrete.html, Dec. 27, 2004.

\* cited by examiner

US 7,353,876 B2

SELF-DEGRADING CEMENT COMPOSITIONS AND METHODS OF USING SELF-DEGRADING CEMENT COMPOSITIONS IN SUBTERRANEAN FORMATIONS

BACKGROUND

The present invention relates to methods of stimulating a subterranean formation. More particularly, the present invention relates to methods of fracturing subterranean formations using a fracturing fluid comprising a self-degrading cement composition.

Hydraulic fracturing techniques commonly are used to stimulate subterranean formations to enhance the production of hydrocarbons therefrom. Conventional hydraulic fracturing operations commonly involve flowing a fracturing fluid down a well bore and into a hydrocarbon-bearing formation at a pressure sufficient to create or enhance at least one fracture therein.

Conventional fracturing fluids may comprise, inter alia, viscosifying or gelling agents to increase their viscosity, and often may include proppant particulate materials that may be deposited in the fractures. Once deposited in the resultant fractures, conventional proppant particulate materials are intended to prevent the fractures from closing so as to enhance the flow of hydrocarbons to the well bore, and thereafter to the surface. Commonly-used proppant particulate materials include, inter alia, sand, walnut shells, glass beads, metal pellets, ceramic beads, and the like.

When the fracturing fluid comprising proppant particulate materials has been placed in the formation, the proppant particulate materials undesirably may settle within the fracturing fluid to some degree before the fracture closes. This may cause the proppant pack to form at an interval different than the desired interval. Further, the viscosifying or gelling agents used in conventional fracturing fluids may form residues within the proppant pack and in the areas of the formation adjacent the fracture, which undesirably may reduce well productivity.

The success of a fracturing operation may depend, at least in part, upon fracture porosity and conductivity once the fracturing operation is stopped and production is begun. Traditional fracturing operations place a large volume of proppant particulates into a fracture and the porosity of the resultant packed propped fracture is then related to the interconnected interstitial spaces between the abutting proppant particulates. Thus, the resultant fracture porosity from a traditional fracturing operation may be closely related to the strength of the placed proppant particulates (if the placed particulates crush then the pieces of broken proppant may plug the interstitial spaces) and the size and shape of the placed particulate (larger, more spherical proppant particulates generally yield increased interstitial spaces between the particulates).

One attempt to address problems that may be inherent in tight proppant particulate packs involves placing a much-reduced volume of proppant particulates in a fracture to create what is referred to herein as a partial monolayer or "high-porosity" fracture. In such operations the proppant particulates within the fracture may be widely spaced, but still may be sufficient to desirably hold open the fracture and allow for production. Such operations may allow for increased fracture conductivity due, at least in part, to the fact the produced fluids may flow around widely spaced proppant particulates rather than merely flow through the relatively small interstitial spaces in a packed proppant bed. Successful placement of a partial monolayer of proppant particulates presents unique challenges in the relative densities of the particulates versus the carrier fluid. Furthermore, placing a proppant particulate that tends to crush or embed under pressure may allow portions of the fracture to pinch or close once the fracturing pressure is released.

Conventional attempts to address the problems described above have involved, inter alia, the use of cement compositions as proppant materials. The cement compositions that have been used in such fashion commonly have comprised particulate carbonate salts. Such salts were intended to have dissolved out of the cement composition, theoretically enhancing the permeability of the resultant set cement sheath to a degree that may facilitate greater flow of formation fluids (e.g., hydrocarbons) to the well bore. Carbonate salts, however, generally require treatment with an acid before they may dissolve out of the cement composition. Treating the cement compositions that comprise carbonate salts with an acid, after the cement compositions have been placed within the subterranean formation, has been problematic, because such acids may tend to find the path of least resistance within the cement composition, which may result in uneven contact between the acid and the cement composition, thereby causing uneven removal of carbonate salt particulates therefrom. Thus, conventional operations that have employed proppant materials comprising cement compositions generally have not enhanced the permeability of the formation to the extent desired.

SUMMARY

The present invention relates to methods of stimulating a subterranean formation. More particularly, the present invention relates to methods of fracturing subterranean formations using a fracturing fluid comprising a self-degrading cement composition.

An example of a method of the present invention is a method of treating a subterranean formation, comprising: providing a fracture in a portion of a subterranean formation; placing a fluid in the fracture, the fluid comprising an acid source, a base source, a water source, and a degradable material; permitting the fluid to set within the fracture to form a solid mass; and permitting the degradable material to at least substantially degrade.

Another example of a method of the present invention is a method of fracturing a subterranean formation, comprising: hydraulically fracturing a portion of the formation to create or enhance at least one fracture therein; placing a fluid in the at least one created or enhanced fracture, the fluid comprising an acid source, a base source, a water source, and a degradable material; permitting the fluid to set within the at least one created or enhanced fracture to form a solid mass; and permitting the degradable material to at least substantially degrade, after the fluid sets in the at least one created or enhanced fracture to form a solid mass, so as to create voids in the solid mass.

Another example of a method of the present invention is a method of producing hydrocarbons from a subterranean formation, comprising: hydraulically fracturing a portion of the formation to create or enhance at least one fracture therein; placing a fluid in the at least one created or enhanced fracture, the fluid comprising an acid source, a base source, a water source, and a degradable material; permitting the fluid to set within the at least one created or enhanced fracture to form a solid mass; permitting the degradable material to at least substantially degrade, after the fluid sets in the at least one created or enhanced fracture to form a solid mass, so as to create voids in the solid mass that permit fluid communication between the formation and a well bore penetrating the formation; and permitting hydrocarbons within the formation to flow through the voids into the well bore and to the surface.

The features and advantages of the present invention will be readily apparent to those skilled in the art upon a reading of the description of the embodiments that follows.

BRIEF DESCRIPTION OF THE DRAWINGS

A more complete understanding of the present disclosure and advantages thereof may be acquired by referring to the following description taken in conjunction with the accompanying figures, wherein.

Figure 1:
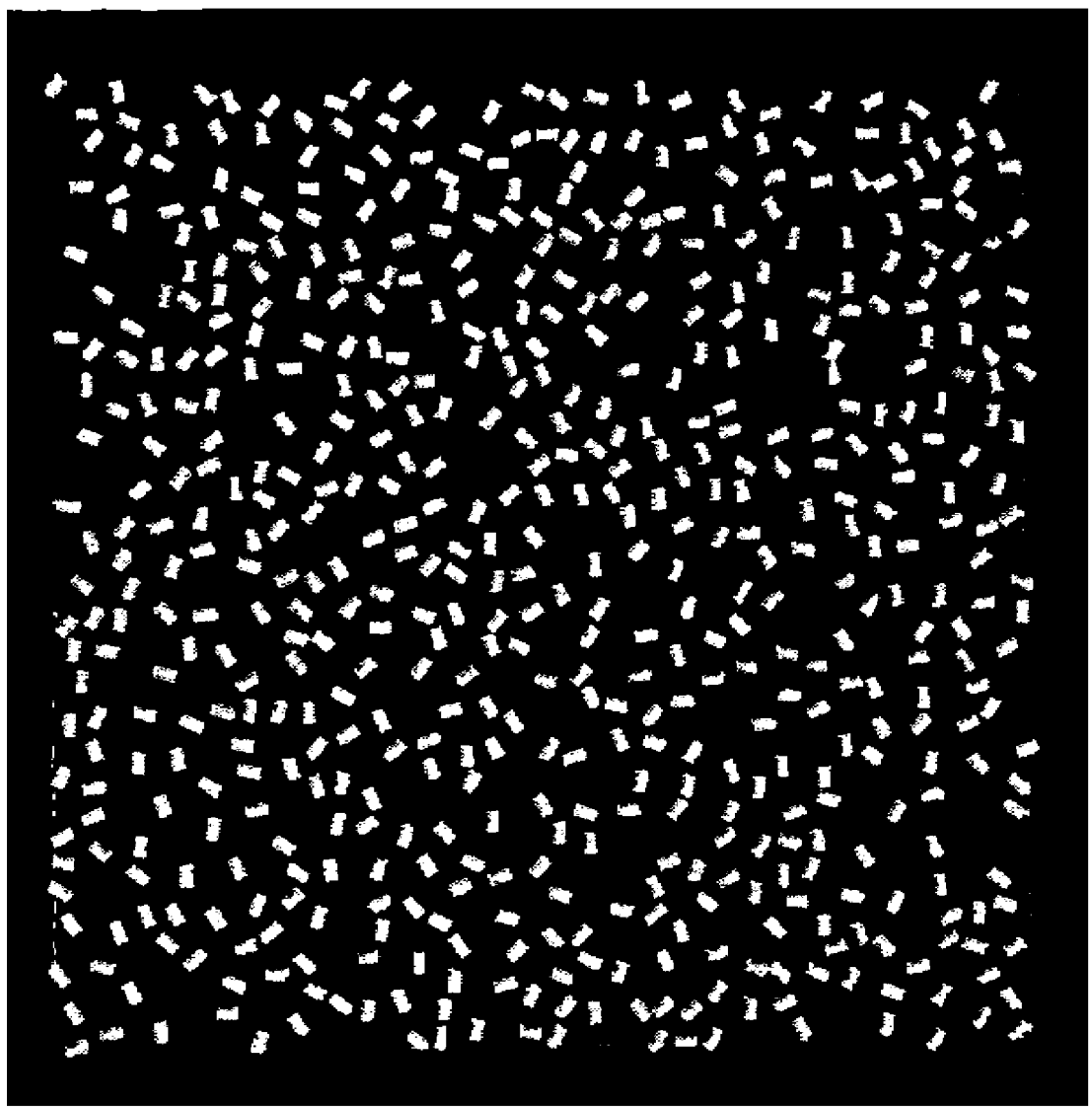
FIG. 1 illustrates the amount of void space that might be demonstrated in an example of a fracture having a porosity of about 80%.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION

The present invention relates to methods of stimulating a subterranean formation. More particularly, the present invention relates to methods of fracturing subterranean formations using a fracturing fluid comprising a self-degrading cement composition.

The self-degrading cement compositions suitable for use in the fracturing fluids of the present invention generally comprise a mixture of a degradable material, an acid source, a base source, and a water source.

Generally, according to certain embodiments of the present invention, the fracturing fluids may be placed in a subterranean formation at a pressure sufficient to create or enhance at least one fracture therein. The self-degrading cement compositions present within the fracturing fluids then may set within the at least one created or enhanced fracture to form a solid mass, and the degradable material within the cement composition then may degrade. In certain embodiments of the present invention, the degradation of the degradable material may create voids within the solid mass that may permit or enhance fluid communication between the formation and a well bore penetrating the formation. In certain embodiments of the present invention, the degradable material used may comprise a mixture of fibers and spherical particles, which may, inter alia, enhance the interconnectivity of voids that may be produced in the solid mass. In certain embodiments of the present invention, the portion of the solid mass that does not degrade may be capable of preventing the at least one created or enhanced fracture from closing (e.g., the portion of the solid mass that does not degrade may form "pillars" within the at least one created or enhanced fracture that may prevent its closure). In certain embodiments of the present invention, the portion of the solid mass that does not degrade may form a partial monolayer in the at least one created or enhanced fracture.

I. High-Porosity Propped Fractures

Porosity values expressed herein are unstressed porosities (e.g., the porosity before a fracture in the formation has closed or applied any substantial mechanical stress).

The methods of the present invention may be used, inter alia, to create high-porosity fractures having increased conductivity as compared to a traditional packed propped fracture. Certain embodiments of the fracturing fluids and methods of the present invention may achieve such increased conductivity by forming "pillars" within the resultant solid mass within the fracture, which pillars may prevent the fracture from closing.

The fractures that may be created or enhanced by the fracturing fluids and methods of the present invention may facilitate the formation of a conductive fracture with porosity much greater than about 40% while still maintaining enough conductive channels for production. Certain embodiments of the present invention may form fractures exhibiting a porosity of at least about 50%. Other embodiments of the present invention may form fractures exhibiting a porosity of at least about 60%, while still other embodiments may form fractures exhibiting a porosity of at least about 70%. Other embodiments of the present invention may be used to form fractures exhibiting a porosity of at least about 80%, while still other embodiments may form fractures exhibiting a porosity of at least about 90%. FIG. 1 illustrates the degree of void space that may be present in a fracture exhibiting a porosity of about 80%.

The fracturing fluids and methods of the present invention may achieve increased conductivity within the formation, at least in part, because the high-porosity fractures they form allow for increased levels of open channels. With a high-porosity fracture there may be more open spaces in the propped fracture that may remain open, even under severe closure stresses, than may be found in traditional applications (including, inter alia, those that may involve high proppant loading).

By increasing the percentage of open spaces within a propped fracture, the methods of the present invention, inter alia, may increase the available space for production.

II. Acid Sources, Base Sources and Water Sources

A broad variety of acid sources and base sources may be suitable for use in the fracturing fluids of the present invention. Examples of suitable acid sources include, inter alia, magnesium chloride ($MgCl_2$), potassium phosphate monobasic ($KH_2PO_4$), phosphoric acid ($H_3PO_4$), magnesium sulfate ($MgSO_4$), and ammonium phosphate monobasic ($NH_2PO_4$). Examples of suitable base sources include, inter alia, magnesium oxide (MgO), and ammonia ($NH_3$). An example of a suitable source of magnesium oxide is commercially available from Martin Marietta under the trade name "MagChem 10." An example of a suitable source of potassium phosphate monobasic is commercially available from Fisher Scientific.

Generally, an acid source and base source may be chosen that may react so as to form an acid-base cement. For example, magnesium oxide may be chosen as a base source, and potassium phosphate monobasic may be chosen as an acid source, so that in the presence of water they may react to produce an acid-base cement having the chemical formula $MgKPO_4 \cdot 6H_2O$. As another example, magnesium oxide may be chosen as a base source, and magnesium chloride may be chosen as an acid source, so that in the presence of water they may react to produce an acid-base cement having three oxychloride phases; one oxychloride phase may have the chemical formula 5 Mg(OH)$_2$)MgCl$_2$·8H$_2$O, which may be referred to as "5-form." As another example, magnesium oxide may be chosen as a base source, and phosphoric acid may be chosen as an acid source, so that in the presence of water they may react to produce an acid-base cement having the chemical formula MgHPO$_4$·3H$_2$O. As still another example, magnesium oxide may be chosen as a base source, and magnesium sulfate may be chosen as an acid source, so that in the presence of water they may react to produce an acid-base cement having four possible oxysulfate phases; one oxysulfate phase may have the chemical formula 3 Mg(OH)$_2$MgSO$_4$·8H$_2$O, which may be referred to as "3-form." As still another example, magnesium oxide may be chosen as a base source, and ammonium phosphate monobasic may be chosen as an acid source, so that in the presence of water they may react to produce an acid-base cement having the chemical formula Mg(NH$_4$)PO$_4$·6H$_2$O. A broad variety of acid sources and base sources may be used, and a broad variety of acid-base cements may be produced, in accordance with the present invention, including, but not limited to, those acid sources, base sources, and acid-base cements that are disclosed in "Acid-Base Cements: Their Biomedical and Industrial Applications," by Alan D. Wilson and John W. Nicholson (Cambridge Univ. Press, 1993).

Generally, the acid source and base source may be present in a stoichiometric amount. For example, in certain embodiments of the present invention wherein magnesium oxide is used as a base source and potassium phosphate monobasic is used as an acid source, their relative concentrations may be illustrated by EQUATION 1 below.

0.15 grams MgO+0.52 grams KH$_2$PO$_4$+0.33 grams H$_2$O→1 gram MgKPO$_4$·6H$_2$O.     EQUATION 1:

EQUATION 1 is exemplary only, and may be modified as one of ordinary skill in the art will recognize, with the benefit of this disclosure. For example, additional quantities of magnesium oxide may be included, in amounts in the range of from about 1% excess by weight to about 25% excess by weight.

The fracturing fluids of the present invention generally comprise a water source. The water source may comprise fresh water, salt water (e.g., water containing one or more salts dissolved therein), brine (e.g., saturated salt water), or seawater. Generally, any water source may be used provided that it does not contain an excess of compounds that may adversely affect other components in the fracturing fluid.

III. Degradable Materials

A broad variety of materials may be suitable as the degradable materials in the fracturing fluids of the present invention. In certain embodiments of the present invention, the degradable material may be a degradable polymer. A polymer is considered to be "degradable" herein if its degradation may be due to, inter alia, chemical and/or radical processes (e.g., hydrolysis, oxidation, enzymatic degradation, UV radiation, and the like). The degradability of a polymer depends at least in part on its backbone structure. For instance, the presence of hydrolyzable and/or oxidizable linkages in the backbone often yields a material that will degrade as described herein. The rates at which such polymers degrade are dependent on factors such as, inter alia, the type of repetitive unit, composition, sequence, length, molecular geometry, molecular weight, morphology (e.g., crystallinity, size of spherulites, and orientation), hydrophilicity, hydrophobicity, surface area, and additives.

The manner in which the polymer degrades also may be affected by the environment to which the polymer is exposed, e.g., temperature, presence of moisture, oxygen, microorganisms, enzymes, pH, and the like.

Suitable examples of degradable polymers that may be used in accordance with the present invention include, but are not limited to, those described in the publication of Advances in Polymer Science, Vol. 157 entitled "Degradable Aliphatic Polyesters," edited by A. C. Albertsson, pages 1-138. Specific examples include homopolymers, random, block, graft, and star- and hyper-branched aliphatic polyesters. Such suitable polymers may be prepared by polycondensation reactions, ring-opening polymerizations, free radical polymerizations, anionic polymerizations, carbocationic polymerizations, coordinative ring-opening polymerizations, as well as by any other suitable process. Exemplary polymers suitable for use in the present invention include, but are not limited to, polysaccharides such as dextran or cellulose; chitin; chitosan; proteins; aliphatic polyesters; poly(lactide); poly(glycolide); poly(ε-caprolactone); poly(hydroxy ester ethers); poly(hydroxybutyrate); poly(anhydrides); aliphatic polycarbonates; poly(orthoesters); poly(amino acids); poly(ethylene oxide); polyphosphazenes; poly ether esters; polyester amides; polyamides; and copolymers and blends thereof. In certain exemplary embodiments of the present invention wherein the degradable material is a degradable polymer, the degradable polymer may be an aliphatic polyester or a polyanhydride. Other degradable polymers that are subject to hydrolytic degradation also may be used.

Aliphatic polyesters degrade chemically, inter alia, by hydrolytic cleavage. Hydrolysis can be catalyzed by either acids or bases. Generally, during the hydrolysis, carboxylic end groups may be formed during chain scission, and this may enhance the rate of further hydrolysis. This mechanism is known in the art as "autocatalysis" and is thought to make polyester matrices more bulk-eroding.

Suitable aliphatic polyesters have the general formula of repeating units shown below:

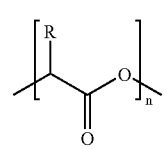

formula I where n is an integer between 75 and 10,000 and R is selected from the group consisting of hydrogen, alkyl, aryl, alkylaryl, acetyl, heteroatoms, and mixtures thereof. In certain embodiments of the present invention wherein an aliphatic polyester is used, the aliphatic polyester may be poly(lactide). Poly(lactide) is synthesized either from lactic acid by a condensation reaction or, more commonly, by ring-opening polymerization of cyclic lactide monomer. Since both lactic acid and lactide can achieve the same repeating unit, the general term poly(lactic acid) as used herein refers to writ of formula I without any limitation as to how the polymer was made such as from lactides, lactic acid, or oligomers, and without reference to the degree of polymerization or level of plasticization.

The lactide monomer exists generally in three different forms: two stereoisomers (L- and D-lactide) and racemic D,L-lactide (meso-lactide). The oligomers of lactic acid and the oligomers of lactide are defined by the formula:

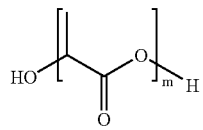

formula II where m is an integer in the range of from greater than or equal to about 2 to less than or equal to about 75. In certain embodiments, m may be an integer in the range of from greater than or equal to about 2 to less than or equal to about 10. These limits may correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications of the present invention where a slower degradation of the degradable material is desired. Poly(D,L-lactide) may be a more amorphous polymer with a resultant faster hydrolysis rate. This may be suitable for other applications where a more rapid degradation may be appropriate. The stereoisomers of lactic acid may be used individually, or may be combined in accordance with the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified by blending high and low molecular weight polylactide or by blending polylactide with other polyesters. In embodiments wherein polylactide is used as the degradable material, certain preferred embodiments employ a mixture of the D and L stereoisomers, designed so as to provide a desired degradation time and/or rate.

Aliphatic polyesters useful in the present invention may be prepared by substantially any of the conventionally known manufacturing methods such as those described in U.S. Pat. Nos. 6,323,307; 5,216,050; 4,387,769; 3,912,692; and 2,703,316, the relevant disclosures of which are incorporated herein by reference.

Polyanhydrides are another type of degradable polymer that may be suitable for use in the present invention. Polyanhydride hydrolysis proceeds, inter alia, via free carboxylic acid chain-ends to yield carboxylic acids as final degradation products. Their erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

The physical properties of degradable polymers may depend on several factors including, but not limited to, the composition of the repeat units, flexibility of the chain, presence of polar groups, molecular mass, degree of branching, crystallinity, and orientation. For example, short chain branches reduce the degree of crystallinity of polymers while long chain branches lower the melt viscosity and impart, inter alia, extensional viscosity with tension-stiffening behavior. The properties of the material utilized further may be tailored by blending, and copolymerizing it with another polymer, or by a change in the macromolecular architecture (e.g., hyper-branched polymers, star-shaped, or dendrimers, and the like). The properties of any such suitable degradable polymers (e.g., hydrophobicity, hydrophilicity, rate of degradation, and the like) can be tailored by introducing select functional groups along the polymer chains. For example, poly(phenyllactide) will degrade at about ⅕th of the rate of racemic poly(lactide) at a pH of 7.4 at 55° C. One of ordinary skill in the art, with the benefit of this disclosure, will be able to determine the appropriate functional groups to introduce to the polymer chains to achieve the desired physical properties of the degradable polymers.

Whichever degradable material is used in the present invention, the degradable material may have any shape, including, but not limited to, particles having the physical shape of platelets, shavings, flakes, ribbons, rods, strips, spheroids, toroids, pellets, tablets, or any other physical shape. In certain embodiments of the present invention, the degradable material used may comprise a mixture of fibers and spherical particles. One of ordinary skill in the art, with the benefit of this disclosure, will recognize the specific degradable material that may be used in accordance with the present invention, and the preferred size and shape for a given application.

In certain embodiments of the present invention, the degradable material used may comprise a self-degrading fiber that comprises an outer shell and a core liquid, wherein the outer shell comprises a degradable polymer and substantially retains the core liquid. In certain embodiments of the present invention, the outer shell may comprise a degradable polymer that is subject to hydrolytic degradation. The core liquid may comprise a liquid that is able to at least partially facilitate or catalyze the hydrolysis of the degradable polymer in the outer shell. Optionally, the self-degrading fiber may comprise a coating on the outer shell and/or a suitable additive within the core liquid, e.g., an additive chosen to interact with the degradable polymer, its degradation products, or the surrounding subterranean environment. In certain embodiments, the outer shell may be non-porous. Methods of making the self-degrading fibers described herein include any suitable method for forming hollow fibers. One such method involves extruding hollow fibers made from a desired degradable polymer; soaking the hollow fibers in a liquid that will be the core liquid; saturating the hollow fibers with the liquid; and drying the exterior of the outer core of the fibers in such a manner that the liquid is retained in the hollow fibers and becomes a core liquid. Another method involves extruding a spinning solution of a chosen degradable polymer from an annular slit of a double pipe orifice to form a sheath solution while simultaneously extruding a liquid through the inside pipe of the double pipe orifice, to form a core liquid within the hollow fibers. Another method involves using capillary action to place the core liquid in an already-formed suitable hollow fiber. Other suitable methods may be used as well.

In choosing the appropriate degradable material, one should consider the degradation products that will result. Also, these degradation products should not adversely affect other operations or components. The choice of degradable material also can depend, at least in part, on the conditions of the well, e.g., well bore temperature. For instance, lactides have been found to be suitable for lower temperature wells, including those within the range of 60° F. to 150° F., and polylactides have been found to be suitable for well bore temperatures above this range.

In certain exemplary embodiments, the degradation of the degradable material could result in a final degradation product having the potential to affect the pH of the fracturing fluid. For example, in exemplary embodiments wherein the degradable material is poly(lactic acid), the degradation of the poly(lactic acid) to produce lactic acid may alter the pH of the fracturing fluid. In certain exemplary embodiments, a buffer compound may be included within the fracturing fluids of the present invention in an amount sufficient to neutralize the final degradation product. Examples of suitable buffer compounds include, but are not limited to, calcium carbonate, magnesium oxide, ammonium acetate, and the like. One of ordinary skill in the art, with the benefit of this disclosure, will be able to identify the proper concentration of a buffer compound to include in the fracturing fluid for a particular application. An example of a suitable buffer comprises ammonium acetate and is commercially available from Halliburton Energy Services, Inc., under the trade name "BA-20."

Also, a preferable result may be achieved if the degradable material degrades slowly over time as opposed to instantaneously.

An example of a suitable source of degradable material is a poly(lactic acid) that is commercially available from Cargill Dow under the trade name "6250D."

When the mixture of a degradable material and acid/base cements in the fracturing fluids of the present invention is placed in a subterranean formation, the mixture may begin to degrade over time in a controllable fashion.

Figure 2:
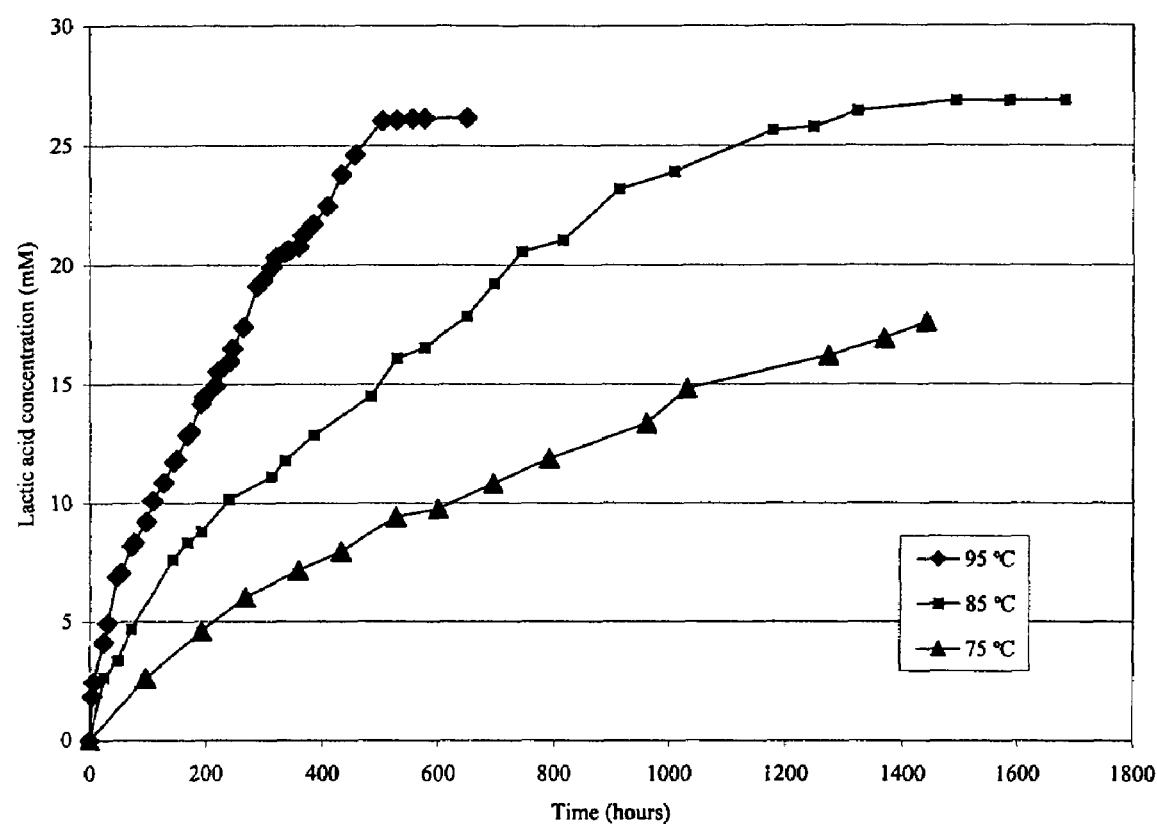
FIG. 2 illustrates an exemplary relationship of the time- and temperature-dependence of the degradation of an exemplary degradable material.
Figure 3:
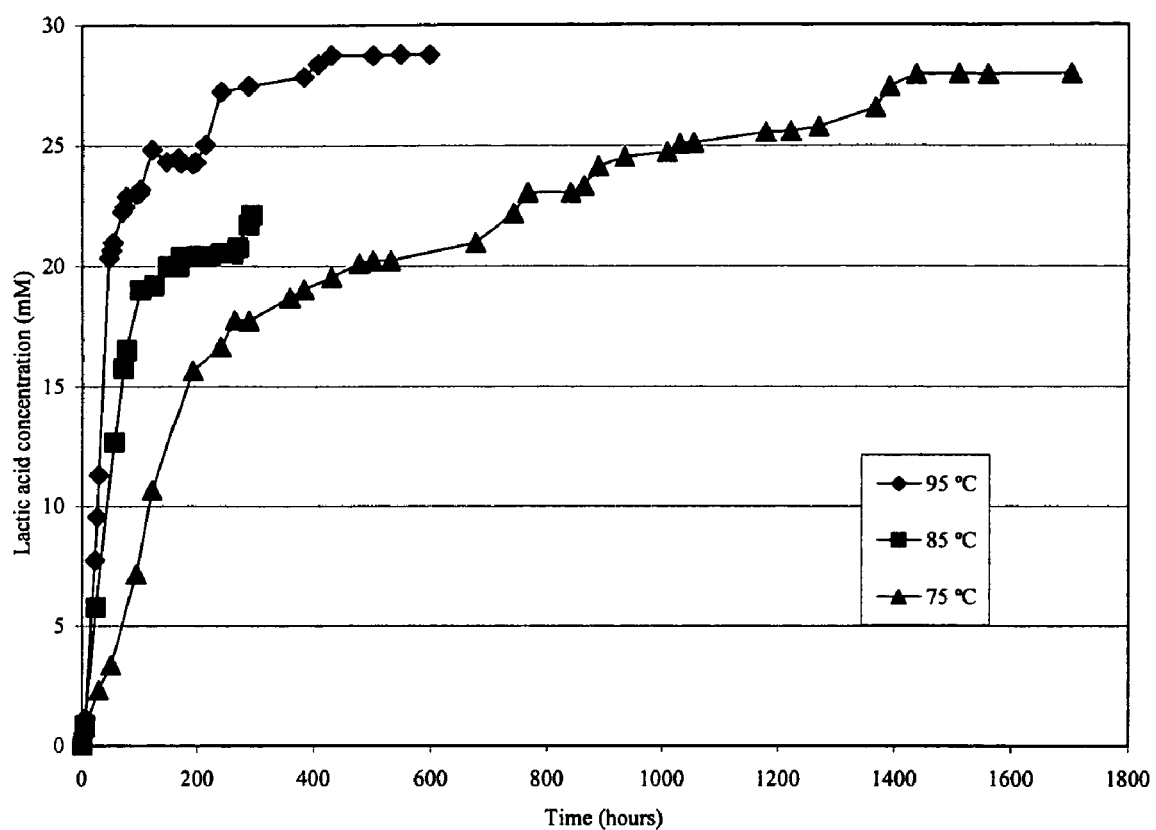
FIG. 3 illustrates an exemplary relationship of the time- and temperature-dependence of the degradation of an exemplary degradable material.

Referring now to FIGS. 2 and 3, illustrated therein are graphical relationships of the time- and temperature-dependence of the degradation of exemplary degradable materials. A synthetic sea water solution was prepared by adding 41.953 grams of sea salt to one liter of deionized water. Next, 1.33 grams of sodium p-toluene sulfonate was added to the sea water solution to form a solution that was 6.919 mM in sodium p-toluene sulfonate. Next, one gram of 6250D or 5639A was placed in a one liter round-bottom flask containing 500 mL of synthetic sea water solution. A reflux condenser then was placed on each flask, and the contents were heated to 75, 85 or 95° C.

Using a disposable pipette, an aliquot was removed from each flask and placed in a 10 mL beaker. A carefully measured aliquot of 5.00 mL was removed and placed in a 50 mL round-bottom flask. The contents of the flasks were frozen by placing the flasks in liquid nitrogen. The flasks then were placed on a high vacuum line and the samples were allowed to dry overnight. After 24 hours, 1 mL of $D_2O$ was added to each flask, and the contents of the flask were stirred until the residue re-dissolved. The freeze drying was repeated to remove $D_2O$ and residual water. The remaining materials were dissolved in $D_2O$ for NMR measurement.

The $^1H$ NMR spectrum was collected using a Bruker 300 Avance NMR spectrometer operating at 300 MHz, using a 5 mm QNP probe at various time intervals. The integrated area of the methyl proton peak of lactic acid was compared to the integrated area of the 6.919 mM sodium p-toluene sulfonate internal standard, and the lactic acid concentration for each point displayed in FIGS. 2 and 3 was calculated from that ratio. FIG. 2 illustrates the time- and temperature-dependence of the generation of lactic acid caused by the degradation of 6250D, while FIG. 3 illustrates the time- and temperature-dependence of the generation of lactic acid caused by the degradation of 5639A.

IV. Preparation of the Fracturing Fluids of the Present Invention

The fracturing fluids of the present invention may be prepared in a variety of ways. For example, in certain embodiments of the present invention, magnesium oxide and potassium phosphate may be added in dry form to a water source. A degradable material then may be added to the mixture to form a fracturing fluid of the present invention. Generally, the degradable material may be present in the fracturing fluids in an amount sufficient to provide a desired degree of void space in the solid mass that may form in the created or enhanced fracture. The void space may result from the degradation of the degradable material, and also may result from subsequent reactions that may occur between the acid-base cement and an acid byproduct that may be produced by degradation of the degradable material.

For certain embodiments of the fracturing fluids of the present invention wherein poly(lactic acid) is used as the degradable material, Table 1 below demonstrates the relationship that may exist between the concentration of poly(lactic acid) in the fracturing fluids and the degree of void space that may result in the solid mass.

TABLE 1

| Poly(lactic acid) concentration (volume percent of the fracturing fluid) | Resulting void space |
| --- | --- |
| 8% | 20% |
| 11% | 30% |
| 13% | 40% |
| 15% | 50% |

Optionally, the fracturing fluids of the present invention may include other additives, such as, but not limited to, a set retarder. After the placement of the fracturing fluids of the present invention within a fracture in the subterranean formation, the water source may combine with the dry materials in the fracturing fluid to form what may be referred to as a "hydrate," e.g., a solid compound comprising water molecules that may combine in a definite ratio. Furthermore, the water molecules within the hydrate may provide a hydrolysis source for the degradable material.

An example of one embodiment of a fracturing fluid of the present invention may be prepared by preparing a two-component dry blend that comprised 22.7% magnesium oxide by weight and 77.3% potassium phosphate by weight. Next, poly(lactic acid) may be added in an amount equal to about 55% by weight of the two-component dry blend, thus forming a three-component dry blend. Water then may be added in a mass ratio of one part water to three parts dry blend. In certain embodiments where the fracturing fluid may be placed in a subterranean formation over an extended period of time, sodium borate (among other additives) may be added; in certain embodiments of the present invention, the sodium borate may be added in an amount in the range of from less than about 8% by weight of the magnesium oxide.

To facilitate a better understanding of the present invention, the following examples of some exemplary embodiments are given. In no way should such examples be read to limit, or to define, the scope of the invention.

EXAMPLE 1

Sample compositions were formed as follows. First, 7.58 grams of magnesium oxide were dry blended with 25.75 grams of potassium phosphate monobasic crystals ($KH_2PO_4$), and mixed with 16.67 grams of tap water. The mixture was stirred for some time, and poly(lactic acid) ("6250D") was added, generally in an amount in the range of from about 35% by weight to about 40% by weight. Certain of the sample compositions further comprised an acid-base cement referred to as Newberyite, and having the chemical formula $MgH(PO_4).3H_2O$. Among other things, Newberyite is thought to impart strength-enhancing properties to the sample composition, and the additional water that Newberyite may supply may facilitate hydrolysis of the degradable material (6250D, in this example). Table 2 sets forth the respective amounts of 6250D and Newberyite included in a particular sample composition.

TABLE 2

| Sample Composition | Poly(lactic acid) ("6250D") | Newberyite |
| --- | --- | --- |
| 1 | 20 grams | Not added |
| 2 | 20 grams | Not added |
| 3 | 20 grams | 10 grams |
| 4 | 15 grams | 10 grams |
| 5 | 15 grams | Not added |
| 6 | 20 grams | 10 grams |
| 7 | 20 grams | Not added |
| 8 | 20 grams | 10 grams |

Generally, each sample composition was placed in a 20 mL plastic cylinder, and was allowed to set therein into a hard rod. Each rod then was left for a designated cure time at room temperature. Next, the set rod was taken out of the cylinder and either tested for compressibility or directly placed in a bomb supplied by PARR Instrument Company, Moline, Ill. Among other things, the bomb prevented the escape of water that may have been present in the set rod. The bomb was heated in a stove at 250° F. After a time, usually 24 hours, the bomb was removed from the stove, and its contents were observed to see whether or not degradation occurred.

Certain sample compositions were tested for compressibility using an apparatus supplied by Tinius Olsen company of Willow Grove, Pa. The procedure was performed as follows. After the sample composition had cured and set into a hard rod, the rod was cut down to a 1 inch diameter and a 3 inch length. Two faces of the rod were smoothed. The rod then was placed under the Tinius Olsen compressibility load cell and subjected to a displacement load at a rate of 0.07 inches per minute. The maximum loading in psi that each rod could withstand until failure was recorded.

The results of the testing are set forth in Table 3 below.

TABLE 3

| Sample Composition | Cure Time (75° F.) | Rod Compressive Strength (psi) | PARR Time (250°F.) | Degradation Comments |
| --- | --- | --- | --- | --- |
| 1 | 24 hours | — | 24 hours | Flowable liquid with particulates about 1 mm in diameter. |
| 2 | 24 hours | 290 | 72 hours | Chunks (5-10 mm in diameter) with some liquid. |
| 3 | 24 hours | 1560 | 24 hours | Small chunks (1-3 mm with some liquid); very "sandy." |
| 4 | 24 days | 2040 | 24 hours | No self-degradation observed |
| 5 | 24 days | 510 | 48 hours | No self-degradation observed |
| 6 | 44 hours | 2470 (High) 490 (Low) | 72 hours | No self-degradation observed |
| 7 | 24 hours | 630 | 24 hours @ 180° F. | No self-degradation observed |
| | | | 24 hours @ 250° F. | Large chunks (>1 cm in diameter) with some liquid. |
| 8 | 24 hours | 1180 | 24 hours @ 180° F. | No self-degradation observed |
| | | | 24 hours @ 250° F. | Large chunks (>1 cm in diameter) with some liquid. |

Example 1 demonstrates, inter alia, that the combination of a degradable material and an acid-base cement may be suitable for use in the methods of the present invention.

Therefore, the present invention is well adapted to attain the ends and advantages mentioned as well as those that are inherent therein. While the invention has been described with reference to embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method comprising:
   providing a fracture in a portion of a subterranean formation;
   placing a fluid in the fracture, the fluid comprising an acid source, a base source, a water source, and a degradable material;
   permitting the fluid to set within the fracture to form a solid mass; and
   permitting the degradable material to at least substantially degrade.

2. The method of claim 1 wherein the acid source comprises at least one acid source selected from the group consisting of magnesium chloride, potassium phosphate monobasic, ammonium phosphate monobasic, and phosphoric acid.

3. The method of claim 1 wherein the base source comprises at least one base source selected from the group consisting of magnesium oxide and ammonia.

4. The method of claim 1 wherein the degradable material degrades after the fluid sets in the fracture.

5. The method of claim 1 wherein the degradable material comprises at least one degradable material selected from the group consisting of: an aliphatic polyester; a polysaccharide; a poly(lactide); a poly(glycolide); a poly($\epsilon$-caprolactone); a protein; a poly(hydroxybutyrate); a poly(anhydride); an aliphatic polycarbonate; an ortho ester; a poly(orthoester); a poly(vinylacetate); a poly(hydroxy ester ether); a poly(amino acid); poly(ethylene oxide); chitin; chitosan; a polyphosphazene; a poly ether ester; a polyester amide; a polyamide; a copolymer thereof; and a blend thereof.

6. The method of claim 1 wherein the degradable material comprises poly(lactic) acid.

7. The method of claim 1 wherein permitting the degradable material to at least substantially degrade comprises permitting the degradable material to degrade so as to create voids within the solid mass, and wherein the voids permit fluid communication between the formation and a well bore penetrating the formation.

8. The method of claim 1 wherein permitting the degradable material to at least substantially degrade comprises permitting the degradable material to degrade so as to create voids within the solid mass; wherein the voids permit fluid communication between the formation and a well bore penetrating the formation; wherein a portion of the solid mass does not degrade; and wherein the portion of the solid mass that does not degrade is capable of preventing the fracture from closing.

9. The method of claim 1 wherein the acid source comprises potassium phosphate monobasic, the base source comprises magnesium oxide, and the degradable material comprises poly(lactic acid).

10. The method of claim 1 wherein the acid source comprises potassium phosphate monobasic, the base source comprises magnesium oxide, the degradable material comprises poly(lactic acid), and wherein the fluid further comprises Newberyite.

11. The method of claim 1 wherein the degradable material comprises at least one poly(orthoester).

12. A method comprising:
hydraulically fracturing a portion of the formation to create or enhance at least one fracture therein;
placing a fluid in the at least one created or enhanced fracture, the fluid comprising an acid source, a base source, a water source, and a degradable material;
permitting the fluid to set within the at least one created or enhanced fracture to form a solid mass; and
permitting the degradable material to at least substantially degrade, after the fluid sets in the at least one created or enhanced fracture to form a solid mass, so as to create voids in the solid mass.

13. The method of claim 12 wherein the acid source comprises at least one acid source selected from the group consisting of magnesium chloride, potassium phosphate monobasic, ammonium phosphate monobasic, and phosphoric acid.

14. The method of claim 12 wherein the base source comprises at least one base source selected from the group consisting of magnesium oxide and ammonia.

15. The method of claim 12 wherein the degradable material comprises at least one degradable material selected from the group consisting of: an aliphatic polyester; a polysaccharide; a poly(lactide); a poly(glycolide); a poly($\epsilon$-caprolactone); a protein; a poly(hydroxybutyrate); a poly (anhydride); an aliphatic polycarbonate; an ortho ester; a poly(orthoester); a poly(vinylacetate); a poly(hydroxy ester ether); a poly(amino acid); poly(ethylene oxide); chitin; chitosan; a polyphosphazene; a poly ether ester; a polyester amide; a polyamide; a copolymer thereof; and a blend thereof.

16. The method of claim 12 wherein the degradable material comprises poly(lactic) acid.

17. The method of claim 12 wherein permitting the degradable material to at least substantially degrade comprises permitting the degradable material to degrade so as to create voids within the solid mass that permit fluid communication between the formation and a well bore penetrating the formation; wherein a portion of the solid mass does not degrade; and wherein the portion of the solid mass that does not degrade is capable of preventing the fracture from closing.

18. The method of claim 12 wherein the degradable material comprises at least one poly(orthoester).

19. A method comprising:
providing a fracture in a portion of a subterranean formation;
placing a fluid in the fracture, the fluid comprising an acid source, a base source, a water source, and a degradable material, wherein
the acid source comprises at least one acid source selected from the group consisting of magnesium chloride, potassium phosphate monobasic, ammonium phosphate monobasic, and phosphoric acid;
permitting the fluid to set within the fracture to form a solid mass; and
permitting the degradable material to at least substantially degrade.

20. The method of claim 19 wherein the degradable material comprises at least one degradable material selected from the group consisting of: an aliphatic polyester; a polysaccharide; a poly(lactide); a poly(glycolide); a poly($\epsilon$-caprolactone); a protein; a poly(hydroxybutyrate); a poly (anhydride); an aliphatic polycarbonate; an ortho ester; a poly(orthoester); a poly(vinylacetate); a poly(hydroxy ester ether); a poly(amino acid); poly(ethylene oxide); chitin; chitosan; a polyphosphazene; a poly ether ester; a polyester amide; a polyamide; a copolymer thereof; and a blend thereof.

* * * * *